0
United States Patent Office 3,213,133
Patented Oct. 19, 1965

3,213,133
ALKYLPHENOXYBENZOIC ACIDS
Charles E. McCoy, Jr., Midland, Mich., assignor to The Dow Chemical Company, Midland, Mich., a corporation of Delaware
No Drawing. Original application June 23, 1960, Ser. No. 38,096, now Patent No. 3,113,849, dated Dec. 10, 1963. Divided and this application Nov. 1, 1962, Ser. No. 240,191
9 Claims. (Cl. 260—520)

This application is a division of my copending patent application S.N. 38,096, filed June 23, 1960, now U.S. Patent No. 3,113,849.

This invention relates to new compounds and to organic fluids gelled by the compounds.

It has been discovered that alkylphenoxybenzoic acids can be made in a variety of ways and have unusual properties. A unique property is the ability of salts of such acids to gel many inert organic fluids when mixed therewith in low concentrations.

Alkylphenoxybenzoic acids may be made in any of several ways. Thus, they are produced by the reaction of alkyl halides with phenoxybenzoic acid in the presence of Friedel-Crafts catalyst; by the reaction of alkylphenols with halobenzoic acids in strong caustic; and by the oxidation of the corresponding alkylphenoxybenzyl alcohol or aldehyde. The preferred synthesis, however, involves the carbonation of the alkylphenoxyphenyl Grignard reagent. Such a synthesis may be shown as follows:

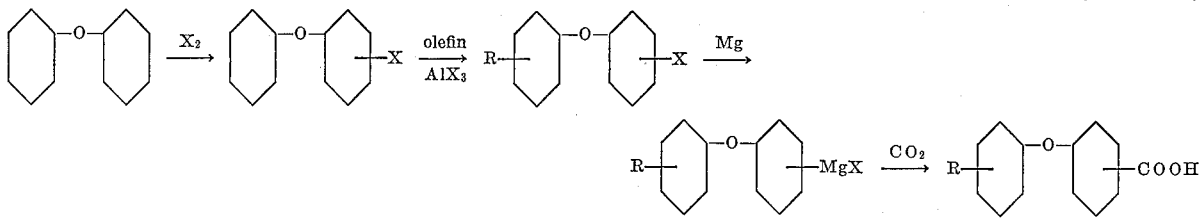

wherein R is an alkyl radical and X is a halogen. The halogen may be chlorine, which is most economical. However, in the interest of greater reactivity, bromo or iodo compounds may be used.

The following example illustrates the preparation of a typical compound of the invention.

Diphenyl oxide was monobrominated with bromine and the monobromodiphenyl oxide was then alkylated with tetrapropylene in the presence of $AlBr_3$, thus forming p-dodecyl-p'-bromodiphenyl oxide.

A Grignard compound was prepared by reacting 230 g. of p-dodecyl-p'-bromodiphenyl oxide with excess magnesium turnings in 500 ml. of tetrahydofuran. The Grignard solution was then poured onto a large excess of Dry Ice (solid $CO_2$). When the Dry Ice had evaporated the product was hydrolyzed by acidification with aqueous hydrochloric acid. The product (organic layer) was separated, dried, and distilled to produce 145 g. (68.5% conversion) of p-(p-dodecylphenoxy)benzoic acid. This was a very viscous liquid having a boiling point of 210–215° C. (0.1 mm.), only very slightly soluble in water but readily soluble in aliphatic hydrocarbons, aromatic hydrocarbons, chlorinated aliphatic hydrocarbons and the like.

Salts of the alkylphenoxybenzoic acids are readily obtained by neutralizing the acids with appropriate bases. A convenient method comprises dissolving the acid in an inert solvent, such as methylene chloride for instance, and agitating the resulting solution with an aqueous solution or dispersion of the base. The alkali metal and ammonium salts are appreciably soluble in water and are effective surfactants therein. Most other salts are substantially insoluble in water and most solvents.

In addition to being effective surfactants, the compounds of the invention are biologically active. Thus, they show autimicrobial activity against harmful organisms, particularly *Staph. aureus.*

An extraordinary property of salts of alkylphenoxybenzoic acids is their great effectiveness as gelling agents for organic fluids. Thus petroleum ether, gasoline, kerosene, trichloroethylene, perchloroethylene, and the like, are effectively gelled by the dispersion therein of small concentrations, of the order of 0.5 to 5% by weight, of such a salt. Gelled hydrocarbons are useful as fuels while gelled halogenated hydrocarbons are useful as fire extinguishants. Both types of gels are useful in paint remover formulations. If the salt used in making such gels is appreciably soluble in water, particularly the alkali metal salts, the gels are sensitive to water and may be liquefied by intimate contact with excess water. The more insoluble salts form gels which are correspondingly more water resistant.

It has been noted that the ability of the salts of the invention to form gels in organic fluids is highly dependent on the alkalinity of the composition. Thus, if the alkylphenoxybenzoic acid is incompletely neutralized, so that the salt thus formed contains appreciable free acid, the product fails to gel organic fluids or, at best, forms weak gels when used in high concentrations. If, however, the acid is completely neutralized, much stronger gels are formed and at much lower salt concentrations. Moreover, if a little alkali is added to the fully neutralized salt, the gelling ability of the salt is enormously increased, so that strong gels are produced by low concentrations of the salt. In the case of the alkali metal and barium salts, the excess alkali may conveniently be an excess of the metal hydroxide corresponding to the salt being formed. In most other cases the low solubility and/or the weak alkalinity of the metal hydroxides so limits the alkalinity obtainable therewith that it is preferable to form the salt by the use of the stoichiometric quantity of base and then attain the desired alkalinity by adding a small proportion of soluble strong base, such as sodium, potassium or barium hydroxide. Of course, this latter procedure doubtless results in the formation of some of the corresponding (i.e., sodium, potassium or barium) salt in the product but the quantity is very small since the amount of excess alkali so used is ordinarily quite small, e.g. 0.001 to 0.1 mol percent.

Another unusual feature of the gel formation by the salts of the invention is the effect of water. If one of the salts, with or without excess alkali, is rigorously dried and then stirred into a dry organic fluid, such as gasoline or perchloroethylene, little or no gel is formed. If there is now added to the composition a few drops of water a strong gel is formed. Salts that have been air-dried or long exposed to air of normal humidity contain enough moisture to form gels readily, though it is sometimes advantageous to add to them a little moisture before using them to form gels. The appropriate amount depends on the particular salt being used as well as the fluid to be gelled. In general, however, .01 to 1% by weight is a suitable water content. A large excess of water may prevent gelation or destroy a gel that is already formed, especially if the salt contains large amounts of an alkali metal salt. The barium salts are highly water-resistant in such gels and, since they are sufficiently alkaline to avoid necessity for other bases being used, they are preferred in the production of water-resistant gels.

To illustrate the present invention, Table I shows several compounds in accord with the invention which have been made by substitution of the appropriate reactants in the process described hereinbefore.

TABLE I

*Alkylphenoxybenzoic acids*

| Ex. No. | Benzoic Acid | Boiling pt.° C. | M.P.,° C. |
|---|---|---|---|
| 1 | p(p-Dodecylphenoxy)- | 210–215 (0.1 mm.) | |
| 2 | p(p-Octylphenoxy)- | | 142–146 |
| 3 | p(p-Pentadecylphenoxy)- | 248–250 (0.4 mm.) | |

Any of a great variety of salts may be made and used as above described, including the Na, K, Li, Al, Mg, Pb, Fe, Ca, Ba, Sr, Ag, Cu, Mn, Sn, Ti, Zn, $NH_4$ and amine salts. Specific examples of preferred salts include sodium and barium dodecylphenoxybenzoates.

The alkylphenoxybenzoic acids of greatest utility as gelling agents for organic fluids are those in which the alkyl group contains at least 9, and preferably 12 to 18 carbon atoms. Those containing smaller alkyl groups are much less effective and require such high concentrations as to make them impractical. In addition to those shown above, tridecyl-, tetradecyl-, hexadecyl- and octadecyl-phenoxy-benzoic acids are particularly effective as gelling agents. Nonyl- and decylphenoxy-benzoic acids are also highly effective, though not as much so as those in which the alkyl group contains 12–18 carbon atoms.

The position on the aromatic ring and the structure of the alkyl group, i.e., whether straight or branched chain, are not critical, though for convenience and economy I prefer those which are branched. Suitable such alkyl groups are conveniently derived from olefin polymers; for instance, propylene polymer containing 3 to 6 propylene units and butylene or isobutylene polymers containing 3 to 4 units.

The soluble salts of the acids of the invention, such as the sodium, potassium and ammonium salts, are excellent surfactants, being useful as detergents, emulsifiers, wetting and dispersing agents and the like. The compounds of the invention are also effective bactericides and may be used as such in washing and sterilizing dishes, food-handling equipment, clothing, floors, bathroom fixtures and the like. For these purposes, aqueous solutions containing about 0.1 to 5% of the active ingredient may serve both as detergent and bactericides while lower concentrations, even as low as 5–10 parts per million, may serve as bactericide alone.

I claim:
1. A compound selected from the group consisting of alkylphenoxybenzoic acids wherein the alkyl radicals contain 9 to 18 carbon atoms and salts thereof.
2. Water-soluble salts of alkylphenoxybenzoic acids wherein the alkyl radicals contain 9 to 18 carbon atoms.
3. Alkali metal salts of alkylphenoxybenzoic acids wherein the alkyl radicals contain 9 to 18 carbon atoms.
4. A compound as defined in claim 3 wherein the acid is p-(p-alkylphenoxy)benzoic acid.
5. Barium salts of alkylphenoxybenzoic acids wherein the alkyl radicals contain 9 to 18 carbon atoms.
6. Dodecylphenoxybenzoic acid.
7. Sodium dodecylphenoxybenzoate.
8. Barium dodecylphenoxybenzoate.
9. A salt of dodecylphenoxybenzoic acid.

References Cited by the Examiner

UNITED STATES PATENTS

| 2,252,665 | 8/41 | Reif et al. | 260—520 |
| 2,252,666 | 8/41 | Reif et al. | 260—520 |

OTHER REFERENCES

Fieser et al., Org. Chem., pages 167, 644–6 (3rd ed., 1960).

Wagner et al.: Synthetic Org. Chem., page 2 (1953).

LORRAINE A. WEINBERGER, *Primary Examiner.*
LEON ZITVER, *Examiner.*